(12) United States Patent
Choi

(10) Patent No.: US 11,588,885 B2
(45) Date of Patent: **\*Feb. 21, 2023**

(54) DYNAMIC PLACEMENT OF COMPUTING TASKS IN A DISTRIBUTED COMPUTING ENVIRONMENT

(71) Applicant: Akamai Technologies, Inc., Cambridge, MA (US)

(72) Inventor: Byung K. Choi, Ypsilanti, MI (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,672

(22) Filed: Apr. 11, 2022

(65) Prior Publication Data
US 2022/0382584 A1    Dec. 1, 2022

Related U.S. Application Data

(63) Continuation of application No. 17/165,545, filed on Feb. 2, 2021, now Pat. No. 11,303,702, and a
(Continued)

(51) Int. Cl.
*H04L 67/1008*    (2022.01)
*G06F 17/18*    (2006.01)
(Continued)

(52) U.S. Cl.
CPC ........ *H04L 67/1008* (2013.01); *G06F 9/4881* (2013.01); *G06F 9/5072* (2013.01);
(Continued)

(58) Field of Classification Search
CPC ............. H04L 67/1008; H04L 67/1023; G06F 11/3433; G06F 17/18
See application file for complete search history.

(56) References Cited

U.S. PATENT DOCUMENTS 6,438,576 B1    8/2002  Huang
6,654,814 B1    11/2003 Britton et al.
(Continued)

OTHER PUBLICATIONS

U.S. Appl. No. 17/165,545, filed Feb. 2, 2021.
(Continued)

*Primary Examiner* — Nicholas P Celani

(57) ABSTRACT

Among other things, this document describes systems, methods and devices for performance testing and dynamic placement of computing tasks in a distributed computing environment. In embodiments, a given client request is forwarded up a hierarchy of nodes, or across tiers in the hierarchy. A particular computing node in the system self-determines to perform a computing task to generate (or help generate) particular content for a response to the client. The computing node injects its identifier into the response indicating that it performed those tasks; the identifier is transmitted to the client with particular content. The client runs code that assesses the performance of the system from the client's perspective, e.g., in servicing the request, and beacons this performance data, along with the aforementioned identifier, to a system intelligence component. The performance information may be used to dynamically place and improve the placement of the computing task(s).

9 Claims, 12 Drawing Sheets

Related U.S. Application Data continuation of application No. 16/289,816, filed on Mar. 1, 2019, now Pat. No. 10,924,534, said application No. 17/165,545 is a continuation of application No. 16/289,816, filed on Mar. 1, 2019, now Pat. No. 10,924,534.

(51) Int. Cl.
  *G06F 11/34*     (2006.01)
  *H04L 67/1023*   (2022.01)
  *G06F 9/50*      (2006.01)
  *G06F 9/48*      (2006.01)

(52) U.S. Cl.
  CPC .......... *G06F 11/3433* (2013.01); *G06F 17/18* (2013.01); *H04L 67/1023* (2013.01)

(56) References Cited

U.S. PATENT DOCUMENTS

| | | | |
|---|---|---|---|
| 10,924,534 B2* | 2/2021 | Choi | G06F 11/3006 |
| 11,303,702 B2* | 4/2022 | Choi | H04L 67/1023 |
| 2021/0243249 A1 | 8/2021 | Choi | |

OTHER PUBLICATIONS

U.S. Appl. No. 16/289,816, filed Mar. 1, 2019, (issued as U.S. Pat. No. 10,924,534).
Transmittal Letter titled Communication Under MPEP § 609.02, submitted with this SB/08 of Apr. 11, 2022, 1 page.

* cited by examiner

DYNAMIC PLACEMENT OF COMPUTING TASKS IN A DISTRIBUTED COMPUTING ENVIRONMENT

BACKGROUND

Technical Field

This application relates generally to dynamic placement of computing operations in a distributed computing system, and testing thereof, including in particular as related to content delivery and/or compute systems.

Brief Description of the Related Art

On the Internet, clients send requests to servers, which respond to those requests. The server that a client contacts may be one of many in a large distributed computing system deployed around the Internet. To service the client's request, the client-facing server may contact other nodes in the system. The system architecture may be hierarchical, with a large set of client-facing servers (also referred to as edge servers, first-tier servers, or leaf nodes) backed up by increasingly smaller tiers of parent servers. The tiers converge at an origin server, which can represents the ultimate source of data and application logic pertinent to the client's request. In some cases, servers in a given tier may contact neighboring servers (e.g., at the same tier) for assistance.

In a fog computing model, a given computing task may be performed at any node in a computing system. Applying this concept to the aforementioned distributed computing system means that any server—or other kind of node—in the system might be called upon to perform some or all of the processing to generate a suitable response to the client.

With reference to FIG. 1A, for example, a client-facing server (the child server in 1A) may receive a client request and itself fetch the data necessary to construct a response to the request, and then construct the response, and finally respond to the client. That server may fetch the requested content locally (e.g., from a cache) or from the origin server, in what is shown as an "fetch from origin".

In other cases, however, as shown in FIG. 1B, a client-facing server (child server in first tier) may receive the client request and generate a forward request to a parent server (second tier) for data necessary to respond to the request. This is what is shown in FIG. 1B by the "forward request" arrows. The parent server might fetch this data from a local memory device (e.g., cache) or from origin server, construct responsive content, and send it back to the client-facing server for transmission to the client. Hence, in FIG. IA, the client-facing server is the locus of the computing tasks of fetch and content generation, whereas in the case of FIG. 1B, the parent server is the locus of those tasks.

FIG. 1B shows only one parent tier, but there may be additional tiers in between the parent and the origin server. In such cases, the parent server may in turn issue a forward request to such a higher tier, causing it to fetch data from the origin server and generate suitable responsive content, sending it back down the chain to the client-facing server. Any combination and mixture of responsibility may be possible.

The decision of where a particular computing task should be performed may be complex, based on many factors. From the client's perspective, the responsiveness of the system is important. In the web domain, to evaluate performance from the client's perspective, it is known to provide performance measurements from within the client device user agent (e.g., a browser) using such tools as W3C Resource Timing and Navigation Timing. Techniques for assessing performance of content delivery services provided by distributed computing systems are described in U.S. Pat. No. 9,736,258, the contents of which are incorporated by reference in their entirety.

Among other things, the teachings hereof improve upon the aforementioned techniques in the area of performance assessment for distributed computing architectures, namely, architectures in which a computing task may be performed at any node in a given system, as described above. The teachings hereof can be leveraged to assess the performance of a distributed computing system depending on where particular computing tasks occur, and adapt the placement of those computing tasks for improved performance. In particular, the teachings hereof can be leveraged to inform dynamic placement of computing tasks for improved performance and responsiveness, from the client's perspective.

BRIEF SUMMARY

Among other things, this document describes systems, methods and devices for performance testing and dynamic placement of computing tasks in a distributed computing environment. The teachings hereof have particular though not exclusive applicability to computing environments in which a given computing task may be performed at any of multiple nodes in the distributed computing system. A node may be a server. In embodiments, a given client request is forwarded up a hierarchy of nodes, or across tiers in the hierarchy. A particular computing node in the system self-determines that it will perform a computing task to generate or help generate) particular content to be used for a response to the client. That content may be, e.g, a web page, web application response, video segment, API data, machine to machine data, for example. The computing node injects an associated identifier into the response indicating that it performed those tasks, and this identifier ends up being transmitted to the client with particular content that was generated. The client runs code that assesses the performance of the system from the client's perspective, e.g., in servicing the request, and beacons this performance data, along with the aforementioned identifier, to a system intelligence component. The performance information may be used to dynamically place and improve the placement of the computing task(s).

In one non-limiting aspect of the teachings hereof, there is a method for placing a computing task within a distributed computing system having first and second servers. The method includes: with a first server, receiving a first request, the first request originating from a client; in response to the first request, the first server sending a forward request; a second server receiving, directly or indirectly, the forward request; in response to the receipt of the forward request, the second server determining whether to perform one or more computing tasks at the second server to generate particular content for the first server to provide in response to the first request. The method further includes, upon a determination by the second server to perform the one or more computing tasks: (i) the second server performing the one or more computing tasks to generate the particular content for the first server to provide in response to the first request; and (ii) the second server sending to the first server, directly or indirectly a response comprising the particular content and a computing task locator that identifies any of the second server and a group of servers of which the second server is a member, as having performed the one or more computing tasks; and (iii) the first server, upon receipt of the particular content and the computing task locator, sending towards the client the response to the first request including both the particular content and the computing task identifier. The method further includes, upon a determination by the second server not to perform the one or more computing tasks: (iv) the second server sending to the first server, directly or indirectly, a response to the forward request; (v) the first server performing the one or more computing tasks to generate the particular content; and (vi) the first server sending, towards the client, the response to the first request including both the particular content and a computing task locator that identifies any of the first server and a group of servers of which the first server is a member as having performed the one or more computing tasks to generate the particular content.

In another non-limiting aspect of the teachings hereof, there is a method performed in a distributed computing system providing a set of two or more nodes deployed in one or more networks between a client and an origin node. The method includes receiving a client request at a first node in the set, wherein the client request requires performance of one or more computing tasks to generate a response thereto; propagating a request within the set to perform the one or more computing tasks; at a second node in the set, determining whether to perform one or more computing tasks at the second node so as to generate particular content to provide to the client in a response to the first request. The method further includes, subsequent to a determination by the second node to perform the one or more computing tasks: (i) the second node performing the one or more computing tasks; and (ii) returning to the client, directly or indirectly from the second node, the result of the one or more computing tasks and a computing task locator that identifies any of: the second node and a group of nodes of which the second node is a member, as having performed the one or more computing tasks. The method further includes, subsequent to a determination by the second node not to perform the one or more computing tasks, the method further comprising at least one of the following (iii), (iv), and (v): (iii) the first node performing the one or more computing tasks, wherein the first node sends, to the client and in response to the first request, the result of the performance of the computing task by the first node, as well as a computing task locator that identifies any of the first node and a group of nodes of which the first node is a member as having performed the one or more computing tasks, (iv) a third node in the set performing the one or more computing tasks, and returning to the client, directly or indirectly from the third node, the result of the performance of the computing task by the third node, as well as a computing task locator that identifies any of the third node and a group of nodes of which the third node is a member as having performed the one or more computing tasks, (v) the client performing the one or more computing tasks.

The teachings hereof may be implemented as devices, systems or methods. The foregoing is a description of certain non-limiting aspects of the teachings hereof for purposes of illustration only; it is not a definition of the invention. The claims define the scope of protection that is sought, and are incorporated by reference into this brief summary. The claims are incorporated by reference into this section as part of the disclosure.

BRIEF DESCRIPTION OF THE DRAWINGS

The invention will be more fully understood from the following detailed description taken in conjunction with the accompanying drawings, in which.

DETAILED DESCRIPTION

Figure 1A:
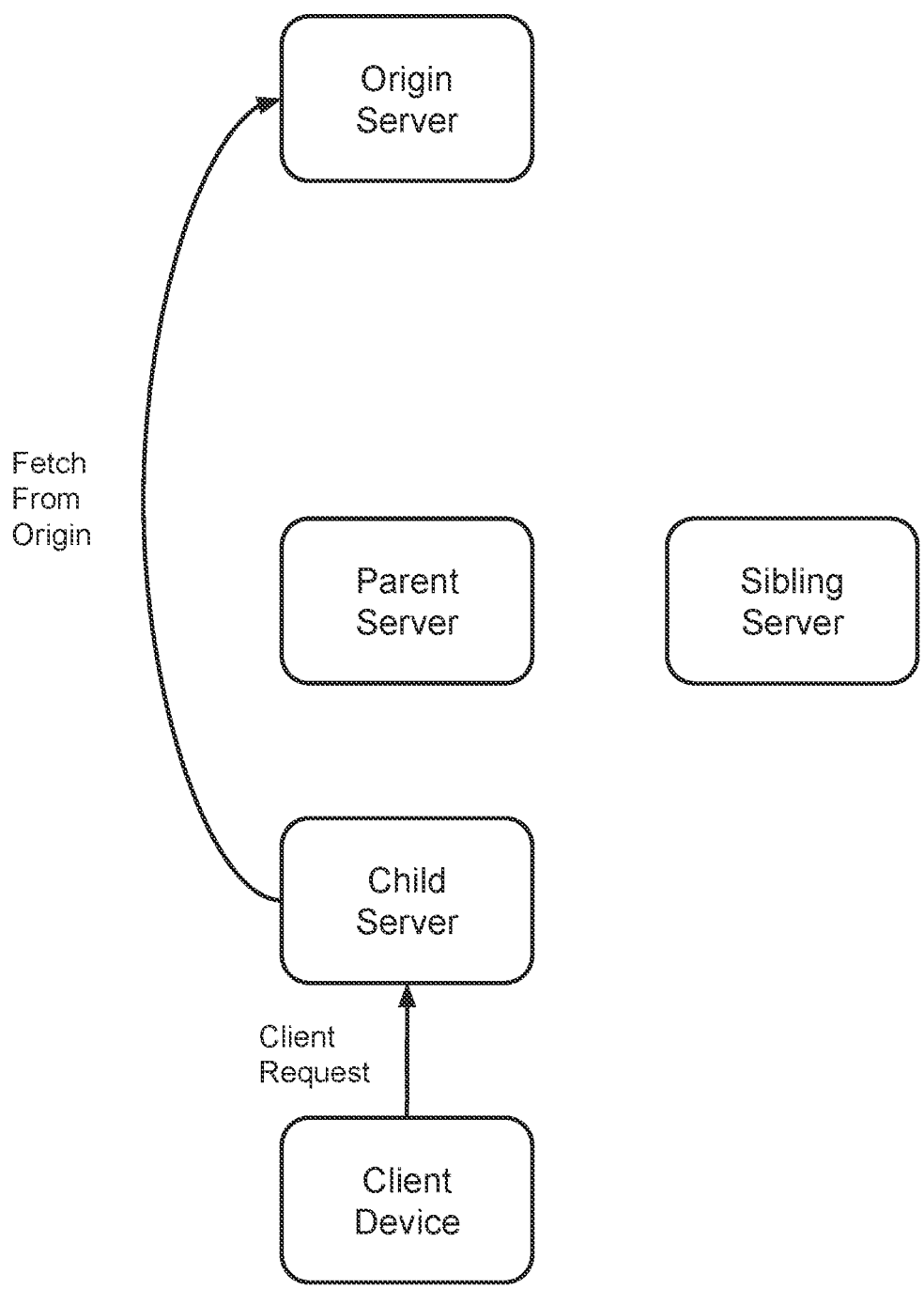
FIGS. 1A and 1B are diagrams illustrating the servicing of a client request where a child server issues forward requests in a distributed computing platform, according to conventional approaches.
Figure 1B:
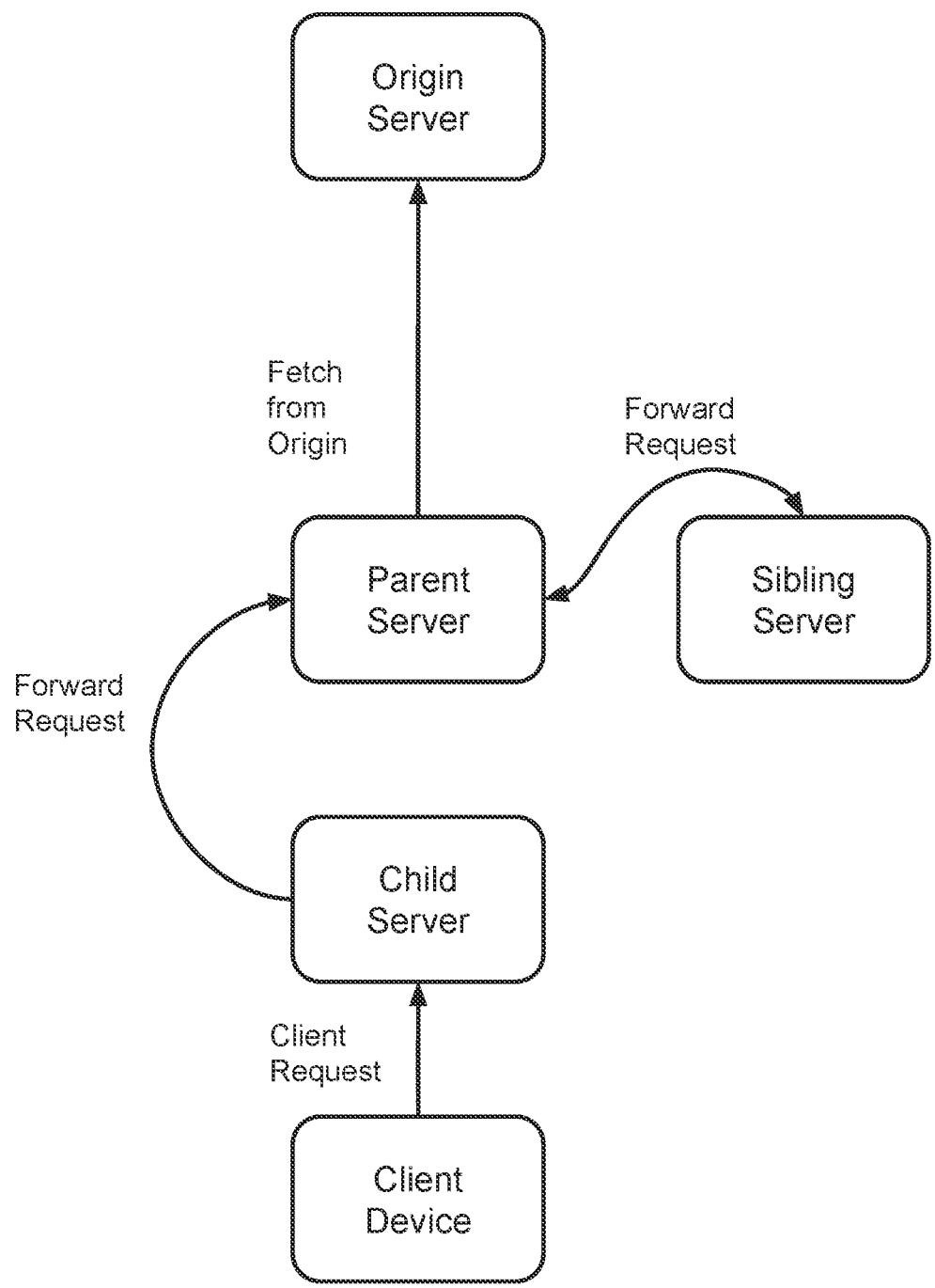

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references mentioned anywhere in this document are expressly incorporated herein by reference in their entirety, and for all purposes. The term "e.g."used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, MQTT, TCP/IP, and UDP, is assumed. All references to HTTP should be interpreted to include an embodiment using encryption (HTIP/S), such as when TLS secured connections are established. The term "server" is used herein to refer to actual or virtualized hardware (a computer configured as a server, also referred to as an actual or virtualized "server machine") with server software running on such hardware (e.g., a web server). The term server thus includes an actual service and a virtual server. In addition, the term "origin" is used to refer to an origin server. Likewise, the terms "client" and "client device" are used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a browser or other user-agent presentation defined by an HTML or other markup language or presentation layer document.

Introduction

Among other things, this document describes systems, methods and devices for performance testing and dynamic placement of computing tasks in a distributed computing environment. The teachings hereof have particular though not exclusive applicability to computing environments in which a given computing task may be performed at any of multiple nodes in a hierarchically deployed distributed computing system. They may also be deployed in mesh configurations. In embodiments, a given client request (or request to perform tasks related thereto) is sent upstream. At a certain point in the series of nodes, a computing node (such as a web server) performs a computing task to generate (or help generate) responsive content. That computing node returns the content down the hierarchy with an attached computing task locator. The content, and any attached computer locator(s), is ultimately returned to the client device by the client-facing node (which itself may attach computing task locator).

The computing task locator is, e.g., an indication of where the computing tasks were performed. For example, it may be an identifier associated with a specific node or a group (e.g, tier) of which the node is a member.

Upon receiving the response, the client runs code that assesses the performance of the system (e.g., in particular the latency of the response or aspects thereof) from the client's perspective. The client beacons this performance data, along with the computing task locator, to a performance assessment component which is referred to herein as the system intelligence component. The performance data may be used, over time, in real-time, or otherwise, to dynamically place and improve the placement of the computing task(s). The aforementioned code run by the client can be, in embodiments, inserted by one of the nodes into the response to? the client, preferably by the client facing node.

A computing task may involve, for example, fetching a web page fragment or other data from an origin server or other remote source, processing that data to generate content to be included in (or as) the response. The first tier node may be an edge server; one or more intermediate tiers may be structured in a hierarchical fashion with client, neighbor, and parent servers.

As mentioned, computing nodes are typically servers that provide client services such as delivery of content (e.g., web pages, web applications, vide© segments, API data, machine to machine data) over the Internet. Hence, the responses may be web pages, web application responses, API responses, and the like; the computing tasks may involve fetching dynamically generated content to incorporate into the aforementioned responses, combining it with static or cached information, and/or generating the final web page, API response, or other content for use in the response to the client.

In some embodiments, a probabilistic approach is used to determine which computing node will perform the computing task(s) for any given client request. This probabilistic approach spreads the computing task locations for a given task across different nodes across the set of client requests, in a coordinated and controlled manner, so that the of ea on performance can be assessed. For example, assume that the computing tasks involve, for a client-requested web page that is constructed with the static fragment and a dynamic fragment, fetching the piece of dynamic content and incorporating it into the static fragment (e.g., according to instructions in either the static content) and thereby generate a complete web page for responding to a client. This is similar to the edge side includes (ESI) operations described in U.S. Pat. Nos. 7,200,681 and 7,752,258, the contents of which are incorporated herein by reference.

According to the teachings hereof, a node can self-determine based on a probability function whether it will perform a computing task, or whether to pass the static fragment and computing task elsewhere (e.g., upstream or downstream in the computing node hierarchy) for completion. The probability function can involve a calculation or function evaluation that is specified in code in the static fragment, or in a configuration information stored at the server directing the server how to handle the client request, or elsewhere.

The probability function evaluation may involve, for example, the calculation of a random number between 0 and 1; if the number falls between a subset of values associated with the host computing node (e.g., 0 to 0.5) then the host node self-determines that it must perform the computing task, otherwise the task is passed to the next node. The subset of values assigned to the each computing node and/or tier determines the probability that such computing node and/tier performs the task, and accordingly spreads the computing task across nodes and/or tiers in accordance with the configured probabilities, providing a fulsome set of sampling data. Because each static content fragment can have its own set of probabilities, each piece of static content can have its own independently specified test protocol. This is merely one example.

With the foregoing by way of introduction, a more detailed description of the teachings hereof is now provided.

Fetch and Assembly of Web Page Fragments to Generate Complete Response

Figure 2A:
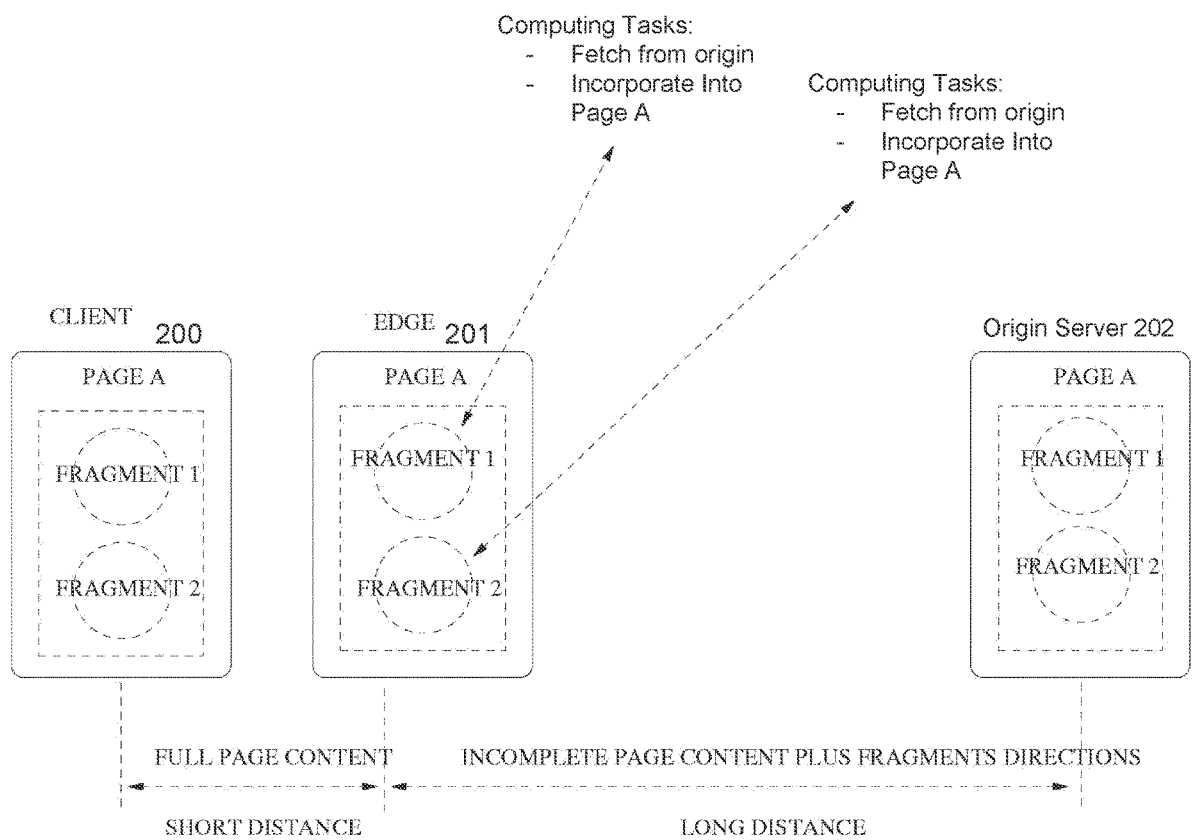
FIGS. 2A and 2 are diagrams illustrating a multi-node distributed computing system that constructs a web page from multiple fragments in response to a client's request, with dynamic placement and testing of computing task location, in accordance with one embodiment of the teachings hereof.
Figure 2B:
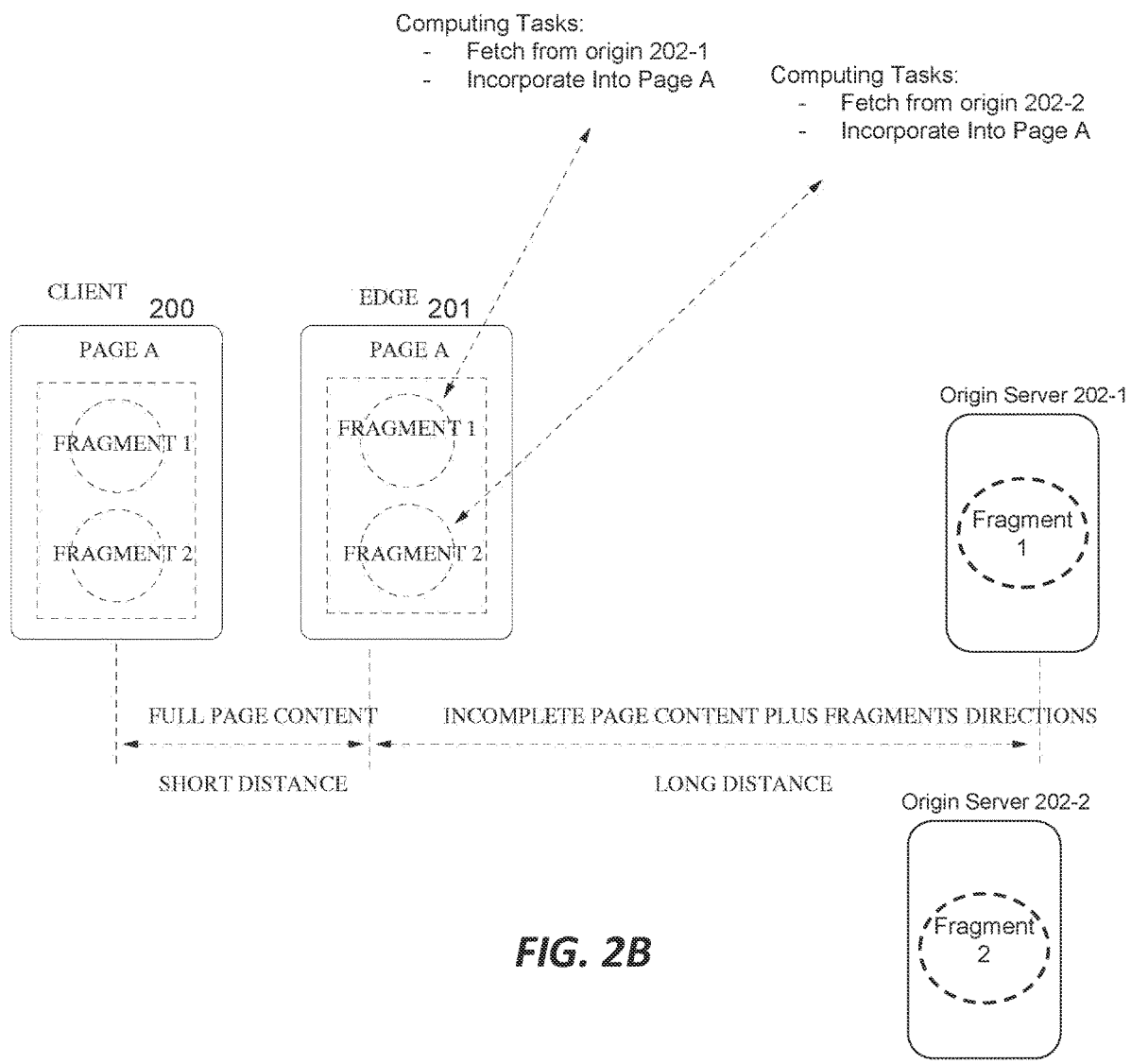

FIG. 2A illustrates a content delivery system in which a client 200 requests a web page that must be constructed from multiple web page fragments. Some fragments may be static content, some may be dynamic. The client 200 requests the web page from the edge server 201, and (in FIG. 2 example) the edge server 201 must perform the computing tasks of fetching fragments 1 and 2 and assembling the web page A. The edge server 201 may be able to fetch a static fragment from local cache, if present and not stale and otherwise valid to serve. Unavailable static fragments as well as dynamic (also referred to as no-store) fragments require fetching from the fragment origin 202. In FIG. 2A, there is one origin 202. However, in other embodiment, the origin for one fragment may be different than that for another, in actual implementations; put another way each fragment may have its own associated origin, independent of other fragments. This is shown in FIG. 2B, with origins 202-1 hosting fragment 1 and 202.2 hosting fragment 2.

Instructions for how to combine the fragments may reside within the static fragment, or in any of the one or more of the fragments, in a configuration at the edge server 201, and/or in separate instructions obtained from the origin 202 for the associated fragment. More information on constructing a web page from fragments at the edge in an edge side include (LSI) operation, can be found in U.S. Pat. Nos. 7,200,681 and 7,752,258, the contents of which are incorporated herein by reference.

In a web page construction operation, computing tasks involved in serving the client 200 include fetching each fragment 1 and 2, fetching the instructions (if needed), and assembling the complete web page A in accord with the instructions. In FIG. 2, theses tasks are all assigned to the edge server 201.

According to the teachings hereof, one or more of the computing tasks can be moved to elsewhere in the system, or even to the client 200 or to the origin 202, and the effect of this from the client's perspective can be tested and monitored.

Figure 3:
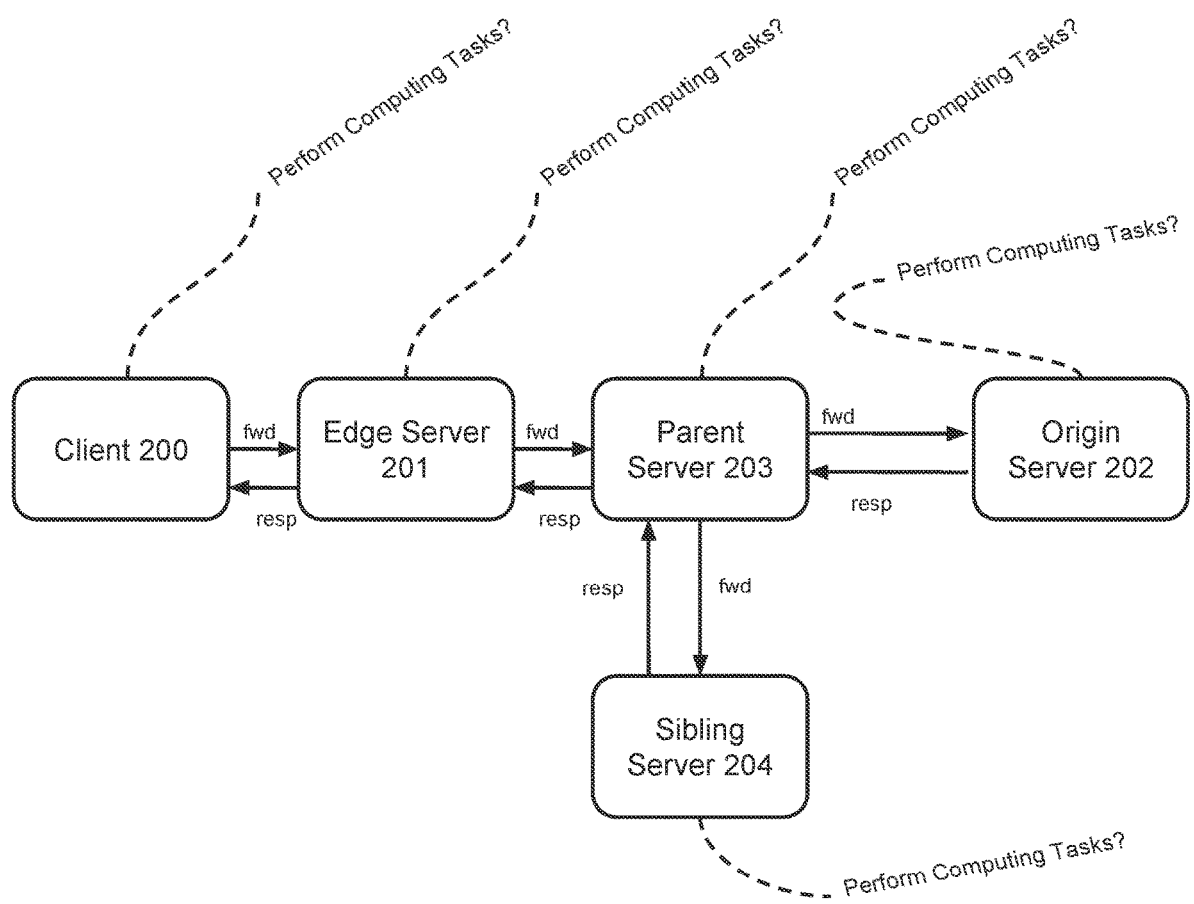
FIG. 3 is a diagram illustrating the potential location of a computing task in the system shown in FIG. 2, in accordance with one embodiment of the teachings hereof.

FIG. 3 shows an embodiment of this approach. A parent server 203 and a sibling server 204 have been added between client 200 and origin 202; a large number of servers could be added. At any given point in the chain, as shown, one or more of the computing tasks might be performed. The arrows 'fwd' generally represent forward requests up the hierarchy towards the origin server 202 for the web page A. At any point, a given server (e.g., 201, 203 , 204, etc.) might perform one or more computing tasks (e.g., fetching fragments from the origin 202 and assembling the web page A) thus relieving the the other nodes of those tasks. The responsive content (the assembled web page A) would be sent back down the chain to the client 200, and these messages are generally represented by arrows 'resp'. Of course, if the edge server 201 performed all computing tasks, interacting directly with the origin 202, then upstream messages in the chain (e.g., arrows 'fwd' and 'resp') may not occur. Note that additional layers of "parent" servers between 203 and origin 202 might also be deployed.

In some cases, even the client 200 might perform the computing tasks, thereby fetching the fragments and constructing the web page A itself.

Although only one origin server 203 is shown in FIG. 3, each fragment of a web page can be associated with its own independent origin, i.e., fetched independently therefrom. Further, an arbitrary number of fragments may be associated with a web page. Only one origin 203 is shown here for convenience of illustration.

In FIG. 3, the entire system participates in making a decision; each node self-determines whether it needs to fetch a fragment, or send the directions for fetching the fragment (and/or whatever other computing task) to another node in the chain based on probability function. From each node's perspective, for a given client request operation, the node fetches the fragment by itself when the probability function instructs it to do so. Otherwise, the node sends the task to the next node. This passing on of the computing task may occur in both directions; examples of each direction.

An example of the operation of the system is now provided. Assume that all the nodes including the origin 202 and the client device 200 are capable of dynamic placement of computing.

Figure 4:
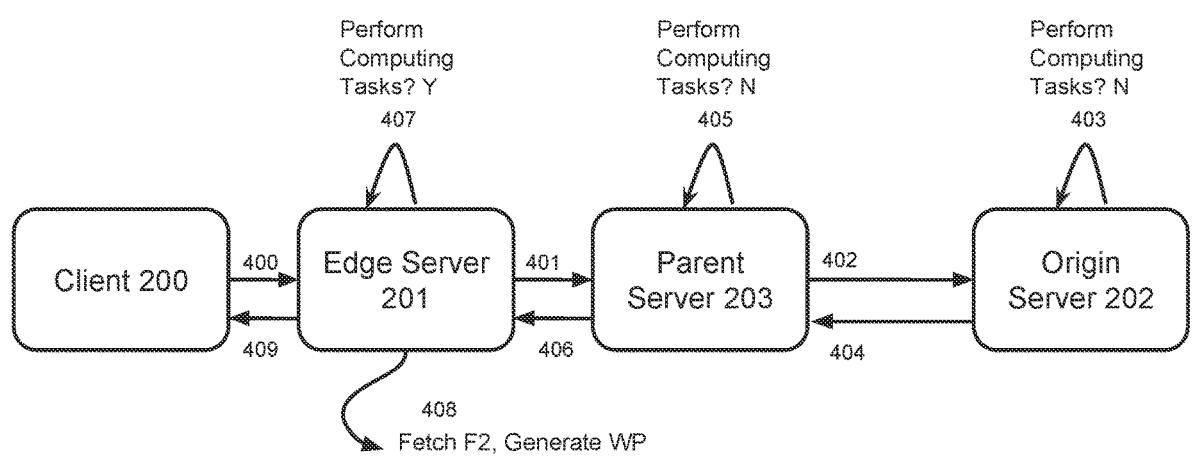
FIG. 4 is a diagram illustrating in more detail the operative message flow in the system shown in FIGS. 2-3, in accordance with one embodiment of the teachings hereof.

FIG. 4 is similar to FIG. 3 but the sibling server is not shown because it is not involved in this particular example. With reference to FIG. 4:

(At 400) The client 200 sends a content request (e.g., HTTP Get request) to the edge server 201 for a web page WP composed of a two fragments, F1 and F2. Assume that F1 is a static object (e.g., a static HTML document) and that it includes (e.g. using ESI or otherwise) a reference to F2 and instructions for including F2 into the F1 to construct a complete web page WP that can be returned to the client 200 at step 409.

(At 401) Assume a cache miss at the edge server 200 for F1. The edge server 200 sends a forward request to the parent server 203 for F1, as well as any necessary headers or other information from the client request. This is, e.g., a conventional proxy operation.

(At 402) Assume a cache miss at the parent server 203 for F1. The parent server 203 sends a forward request to the origin server 202 for F1. This is, e.g., a conventional proxy operation.

(At 403) The origin server 202 retrieves F1 from storage. The origin server 202 then examines F1 to find the reference to F2. The origin server 202 also find a probability function embedded within F1, or otherwise associated with this operation. The origin server 202 executes the probability function to determine whether it should fetch F2 and perform the necessary processing to incorporate F2 into F1 and generate WP. Note that F2 may reside at the origin server 202 or another (remote) origin server. An example probability function is given later in this document and described in more detail there.

(At 404) Assume the origin server 202 determines not to perform the computing tasks of fetching F2 and incorporating F2 into F1. The origin server 202 returns F1 to the parent server 203.

(At 405) The parent server 203 executes the probability function to determine whether it should fetch F2 and perform the necessary processing to incorporate F2 into F1 and generate WP.

(At 406) Assume the parent server 203 determines not to perform the computing tasks of fetching F2 and incorporating F2 into F1. The parent server 203 returns F1 to the edge server 201.

(At 407) The edge server 201 executes the probability function to determine whether it should fetch F2 and perform the necessary processing to incorporate F2 into F1 and generate WP.

(At 408) Assume the edge server 201 determines that it should perform the computing tasks. Accordingly, it fetches F2 and generates WP. The edge server 201 then attaches a computing task locator, which may be any suitable identifier for the edge server 201 or a group of servers (e.g., a tier) of which the edge server 201 is a member. In general the computing task locator tells the system where the computing tasks were performed. The locator could be embedded directly into WP (e.g., a tag or comment), included in a HTTP header field, or otherwise.

Preferably, the edge server 201 also inserts code into WP to effect real user monitoring (RUM), in a manner consistent with W3C Navigation Timing and Resource Timing specifications, as described in U.S. Pat. No. 9,736,258, the contents of which are incorporated by reference. This code upon execution by the client browser, will cause the client to collect and send performance measurements related to the loading of WP in a beacon back to the edge server 201, or some other designated endpoint associated with the system. The code can specify that the computing task locator is included in a custom field in the beacon. The general mechanism for deploying a custom beacon field to gather including custom data (but not a computing task locator) are described in the aforementioned patent. In other embodiments, the client 200 can be instrumented to perform (natively) the performance measurement and beaconing without the need for inserted code.

(At 409) The edge server 201 returns the completed page WP to the client 200, which loads the WP, executes the code, and sends back a beacon with the computing task locator (not shown in FIG. 4) to the edge server 200 or other endpoint in the system.

In the above example, the edge server 201 performed the tasks of fetching F2 and generating WP. What if the parent server 203 had decided to perform the tasks? Indeed, in some percentage of cases, as dictated by the probability function, this will occur. In such cases, the parent server 203 would fetch F2 and generate WP and attach a computing task locator associated with the parent server 203.

What if neither the parent 203 nor the edge 201 had performed the tasks? Then, the client 200 would need to perform the fetching of F2 itself, and a computing task locator for the client 200 could be included in the beacon. Of course, in some implementations, it may be desired that the client 200 never have to perform such tasks; hence, in those embodiments, the edge server 201 can perform the computing tasks if they have not already been performed by some upstream node.

The probability function can be adjusted over time to give appropriate sampling of the computing tasks being performed at each node. For example, by giving some higher probability toward fetching and generating WP at the parent server 203 than at the origin server 202, the parent server 203 has higher chances of fetching unfetched fragments. With even higher chances of fetching unfetched fragments, the edge server 201 has higher chances of fetching the unfetched fragments than the parent server 203. As mentioned, at least in some embodiments, the client 200 has no other option but to fetch unfetched fragments by itself if there are still unfetched fragments.

It should be noted that more than the teachings hereof may be used with web pages composed of any number of fragments, each with its own origin server and each associated with its own probability function distributing the responsibility for constructing the web page across the nodes with a different frequency.

Generalizing, the responsive content need not be a web page. The teachings hereof can be with respect to any content constructed by any number of fragments. The results of the performance testing captured in the beacons helps determine the best location in the system for the fetching and incorporation of each fragment.

Figure 5:
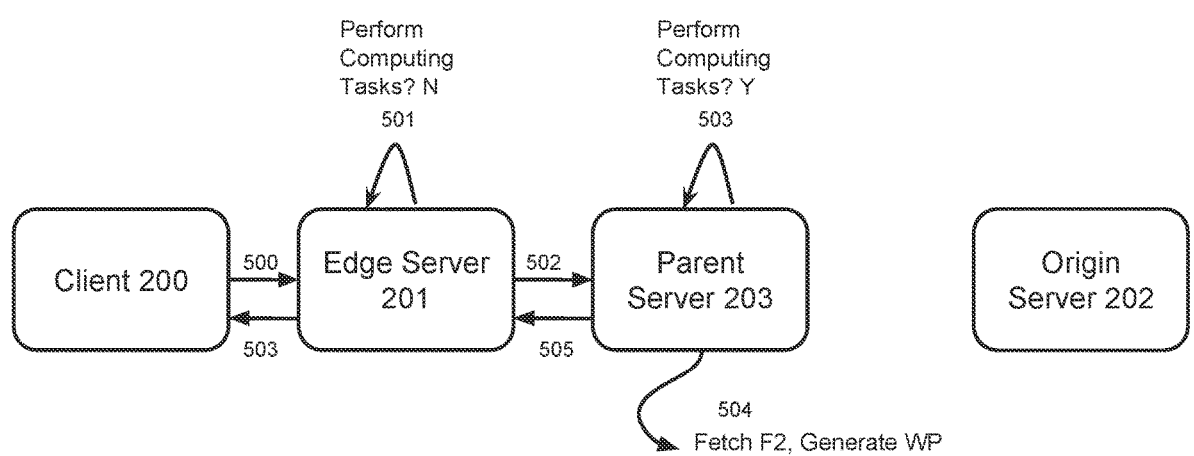
FIG. 5 is a diagram illustrating in more detail the operative message flow in the system shown in FIGS. 2-3, in accordance with another embodiment of the teachings hereof.

While FIG. 4 illustrated the notion of moving the locus of a computing task downstream, FIG. 5 illustrates the upstream case.

With reference to FIG. 5:

(At 500) The client 200 sends a content request (e.g., HTTP Get request for a web page) to the edge server 201 for a web page WP composed of a two fragments, F1 and F2. Assume that H is a static object (e.g., a static HTML document) that includes ESI directives referencing F2 and directives for including F2 into the F1 to construct a complete web page WP that can be returned to the client 200.

(At 501) Assume a cache hit at the edge server 200 for F1. The origin server 202 retrieves F1 and examines F1 to find the reference to F2. The edge server 200 executes the F1-embedded or otherwise associated probability function to determine whether it should fetch F2 and perform the necessary processing to incorporate F2 into F1 and generate WP.

(At 502) Assume the edge server 200 determines not to perform the computing tasks of fetching F2 and incorporating F2 into F1. Instead, the edge server 200 sends a forward request upstream to the parent server 203 with F1 attached, as well as the client request and/or any necessary headers therefrom. (In many cases, of course, it would be best for the edge server 200 to fetch F2 and generate WP. Perhaps, however, theses tasks are compute heavy and/or the fetch has high latency, and therefore it is feasible to offload the generation of WP upstream to the parent server 203.)

(At 503) The parent server 203 executes the probability function to determine whether it should fetch F2 and perform the necessary processing to incorporate F2 into F1 and, generate WP.

(At 504) Assume the parent server 203 determines that is will perform the computing tasks of fetching F2 from the appropriate origin and incorporating F2 into F1. The parent server 203 performs these tasks, generates WP and attaches its computing task locator.

(At 505) The parent server 203 returns WP to the edge server 201.

(At 506) The edge server 201 returns WP to the client 200 in response to the client's request. Preferably, the response at 506 contains the code causing the client to gather performance measurements and beacon them to the system. That code may be inserted by the parent server 203 or the edge server 200.

As those skilled in the art will understand, either of FIG. 4 or 5 could be modified to include the possibility that the sibling server 204 perform the computing task(s).

Figure 6:
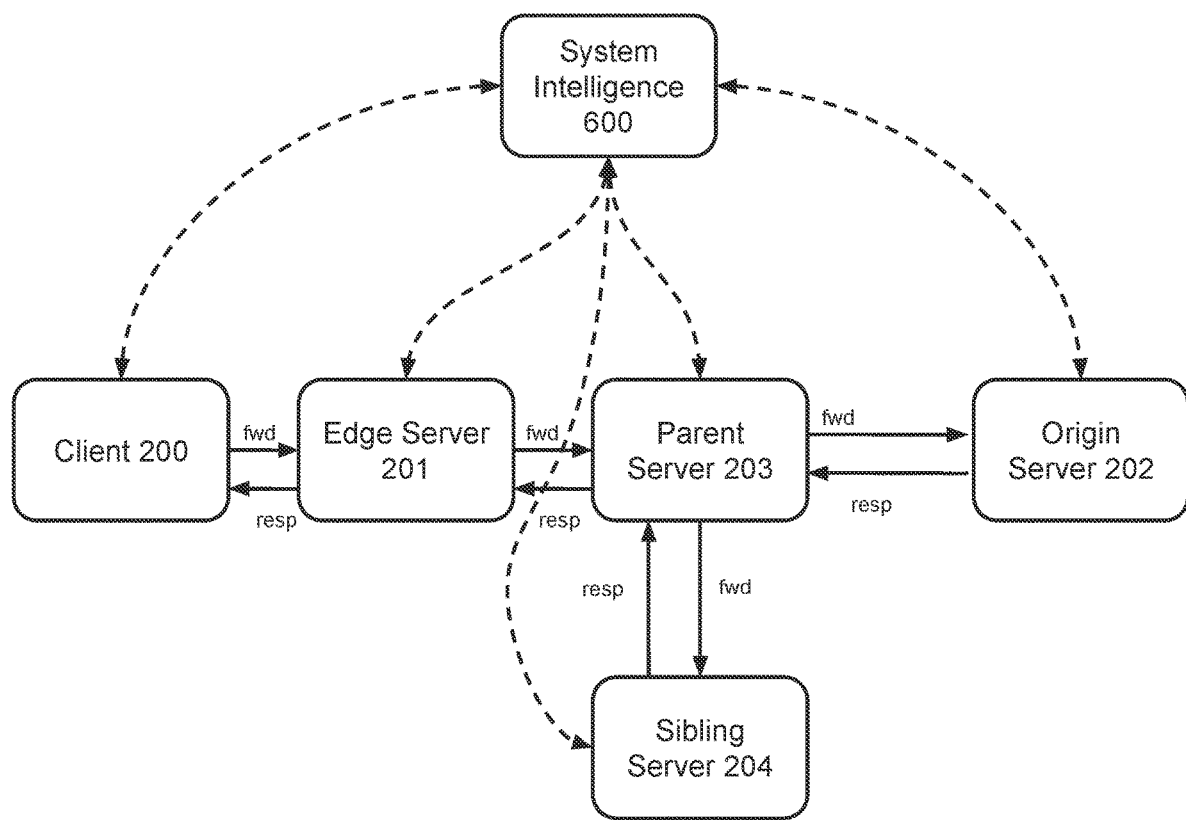
FIG. 6 is a diagram illustrating the system of FIGS. 2-5 with a system intelligence component for handling performance feedback and making computing task location adjustments, in accordance with one embodiment of the teachings hereof.

According to the teachings hereof, an intelligence gathering component (FIG. 6) for the system can collect the performance data (beacons) from all participating client devices and processes them such that statistical conclusions can be made. Thus the intelligence component 600 can be the beacon endpoint mentioned earlier; see FIG. 6.

Such conclusions can reveal, for example, with a given client identification and the target page with 6 fragments, for example, that the parent 203 is recommended to fetch and incorporate Fragment 1, 3 and 5 for the best statistical performance, the edge 200 is recommended to fetch and incorporate Fragment 2 and 4, the content origin 202 is recommended to fetch and incorporate Fragment 6.

Such statistical conclusions are fed back to all the nodes, potentially including even the origin 203 and in some cases the client 200. All the nodes change the probability function in accordance with the recommendations. This means that the intelligence component would instruct each node to either raise, lower, or keep constant the probability that it self-determines to perform a given computing task. For example, all nodes can change a threshold value (or other tuning parameter) of the probability function in accordance with the recommendations. For a given pair of client and fragment, at the parent node for example, the threshold can change to (0 - 0.9) from (0 - 0.5), with which the parent will fetch the fragment 90% of the service rather than 50% of the time. The probability function itself doesn't need to change. This kind of threshold change can be based on the fragment fetch performance analysis/statistics gathered by the beacons.

Statistical conclusions can be reached in a variety of ways. For example, one can use the average or median values as the single representative value for a configuration. For example, assume the configuration were that the edge performs a task with 30 percent probability, parent 60 percent, origin 10 percent. For every response associated with a computing task location, the average or median value would be calculated for the response times of the fragment fetch or other computing task. If that average or median value proved to be better, for example, when the parent server performed the computing task, then the probability of the parent can be increased. In other embodiments, the variance, percentile scores, or some derivative functions therein, etc. of the performance data could be used. Whatever method is used, the goal is to assess the relative performance of the computing task location and then adjust to the location so as to have the client see better performance in the form of a better response time.

If the statistical method outlined above does not result in an expected better outcome (put another way, the statistics are ambiguous as to how to adjust the probabilities for locating the computing task), then a method like machine learning could be used. Generally speaking, the machine learning approach can leverage pattern matching between inputs (e.g., the vector of computing task probability at each node and outputs (distribution of response time reported by the beacon). Once a sufficient amount of training is performed, assuming comparable network conditions, the machine learning algorithm can recommend a desirable set of probabilities {client w %, edge x %, parent y % and origin z %}. Network conditions may change but the machine learning can be retrained and thereby adapt. If some fundamental change happens, fragment origin relocation for example, another round of training would be performed.

The machine learning engine thus uses a systematic pattern matching between inputs and outputs, where the output is constantly become the next input. Of course, some statistical methods will have to create the inputs and outputs for the machine learning engine.

In sum, statistical conclusions, possibly supplemented with machine learning for pattern matching, can be used in the intelligence component 600. Generalizing, any method of assessing the performance associated with each computing task location and optimizing the location based on (for a given set of circumstances) can be used with the teachings hereof.

This cycle, probabilistic performance of computing tasks like fetching, and probability adjustment at each node, continues so that over some time, the probability of a computing task stays around the optimal value. The end result will be that different computing tasks (e.g., different fetches) will be performed by different nodes for best performance and efficiency.

Because the feedback-based self adjustment can find optimal conditions by itself with varying conditions, the initial probability value at each node is not critical although different seed values can give different settlement time.

In embodiments where the client 200 and/or content origin 202 are not capable of dynamic computing placement, the scope of the proposal scales back to only the other nodes 201, 203, 204 in the distributed computing system.

Performance Reporting

The performance reporting by the client 200 is typically implemented in JavaScript in the industry, which, when executed, collects the values of the given metrics such as recommended by W3C. The timing information recommended by W3C is thorough and complete enough to characterize the performance of, e.g., fragment fetching or other latencies introduced by different nodes. Each downloadable object is recorded associated with the timing information.

The performance measurements are reported back in beacons to the intelligence component 600. In some embodiment, the assigned edge server 201 can aggregate and relay the information to the intelligence component 600. Rather than beaconing, an alternative method of implementation of this is to use a cookie, from the client 200 to the edge 201, which is subsequently forwarded to the intelligence component 600.

The teachings hereof do not require that every client 200 participate in the performance reporting. The edge 201 runs some probability function such that only a small subset of the clients 200 are selected for the participation. This is because a small scale sampling of performance reporting by location and time will be sufficient for the dynamic computing placement purposes. As mentioned above, in the industry, this type of performance measurement and reporting by client device is called RUM, i.e., real user monitoring or real user measurement.

Probability Function

An example of an embedded probability function is shown below. This example uses ESI language, and may be embedded in a fragment (e.g., F1 above) which the given server reads, or in a configuration file stored in each node that the node associates with the request for WP and that direct the node how to handle client requests.

```
<esi:choose>
    <esi:when test="$(PLACE)== 'parent' && $(rand( )) > 0.5">
        <esi:include src="https://www.example.com/fragment2.htm1"/> //F2
        <esi:assign name="FETCH" value="$(PLACE_ID)"/>
    </esi:when>
    <esi:otherwise>
    </esi:otherwise>
</esi:choose>
```

This example is for the parent server 203. In this example, the fragment, fragment2.html, is fetched only when the function returns a value greater than 0.5 at the parent server 203. When fetched, the fragment download information needs to be annotated with the place (computing task locator) for the parent, for statistical analysis purposes.

The function rand( ) is supposed to return a normalized value between zero and one. The two variables, PLACE and PLACE_ID are assumed available in support of this proposal. This kind of variable is created.

The above chunk of code only specifies the parent server 203 probability (which is 50%, as indicated by the 0.5). A complete test bed includes the above EST listing with the probability calculation for each place, e.g., origin, edge, sibling, etc. Of course, each node only needs the logic for the probability function that applies to it, so the configuration of the system can involve distributing this logic across the nodes.

Importantly, no new language feature is required to be invented to support the framework described herein. The above code implementation can be considered a generalized version of ESI. As such, one easy way of implementation is to utilize the well established rich set of existing features of edge side includes (ESI) readily available by some CDN providers and the teachings of which are in standards from W3C. Note that the language of dynamic testing and placement of computing for fragments is an implementation choice, not a mandatory part of the proposal. one could design a whole new language to support the framework.

The specified probabilities in the above code can be adjusted as a result of the intelligence component's 600 conclusions. For example, when statistical conclusions show the best performance of a fragment fetch by the parent 203, the system sets the fetching probability for the parent server 203 to a high value but still less than 100%. For example, the parent sets the probability to 99%. The consequence is that the edge 201 will have to fetch the fragment when the parent does not, about 1 percent of the time. If the origin 202 participates, it can be 1% fetching probability by the origin 202, 98% by the parent 202, and remaining 1% by the edge 201. The client 200 will not have a probability specified as it is the end point of the entire delivery chain.

The end result is that the intelligence component 600 can compare the performance data at each cycle. Changes of fragment origin locations or other performance-impacting network changes will be detected this way.

The initial threshold value, 99% or 98% in this example, can be determined by humans as part of operating parameters. The time period for one statistical cycle is also part of such parameters that humans will optimize by experience for each target page. An advanced implementation will be able to automate the adjustment of the probability and the analysis cycle.

In some embodiments, the probability function can be augmented or changed such that the decision whether to perform the computing tasks is conditioned upon the server having some capability (e.g., a particular software or hardware feature installed, and/or a particular high speed connection to the origin, or the like). In other cases, the condition could be based on the current load of the server. In this way, only servers in the distributed computing system with the requisite conditions then provide the computing tasks.

Dynamic Placement of Computing Task—Cycling Through Test Periods

Table I, below, shows a possible scenario of dynamic placement of computing task. (The values in Table I are arbitrary values provided for teaching purposes, not results of an actual experiment or test.)

The Table I example has four nodes, the origin 202, the parent server 203, the edge server 201 and the client 200. Again, there could be more intermediary nodes, and the page origin and client may or may not participate.

TABLE I

| Nodes | 1st period | 2nd period | ... | x-th period | (x + 1)-th period |
|---|---|---|---|---|---|
| origin | 10%, 400 ms | 1%, 400 ms | ... | 1%, 500ms | 1%, 500 ms |
| parent server | (30%, 40%) 200 ms | (97%, 98%) 200ms | ... | (97%, 98%) 300 ms | 1%, 300 ms |
| edge server | (50%, 90%) 300 ms | (1%, 50%) 300ms | ... | (1%, 50%) 200 ms | (97%, 99%) 200 ms |
| client | (10%, 100%) 500 ms | (1%, 100%) 500 ms | ... | (1%, 100%) 400 ms | (1%, 100%) 400 ms |

Assume there is some time period of observation to reach statistical conclusions on the download performance. In this example, the beginning or seed probability of the nodes are 10% at the page origin, 30% at the parent, 50% at the edge server and 10% at the client device. In the table, these percentages are the first one in the parenthesis, representing the percentage out of the whole. The latencies associated with performing the computing task and incorporate operation at each node are shown (again ese are merely arbitrary values for explanatory purposes).

Assume further that the second percentage in the parentheses represents the percentage of computing task performed by the node, not by the whole point of view. For example, in the first period, the parent is configured to conduct the computing task for 30% of the whole traffic. Because the parent actually receives only the 90% of the whole traffic with computing tasks still unperformed, and, because the origin performed the tasks for 10% of the traffic already, in order to meet the 30% requirement, the parent performs the task for 40% of traffic where it has not been performed yet.

Likewise, the edge is configured to perform the computing tasks for 50% of the whole traffic. Since about 40% of the whole is already performed by the page origin and parent already, the edge performed for about 90% of the traffic where the tasks are yet to be performed. Lastly, the client has no choice but to perform the computing tasks for all as-yet-unperformed traffic regardless of the global percentage it serves.

Assume, for the purposes of illustration only, that at the end of the first observation period, it is found that the performance was the best on average when the parent performed the computing tasks (e.g., assume of fetching F2 and incorporation into the WP). So the intelligence component 600 directs that each node, in the second time period, should change the probability accordingly in order to maximize the performance. Sometime later however, at the end of the x-th period, the intelligence component 600 observes the edge is the optimal location. In the following period therefore the two nodes, parent and edge change the probability values respectively.

This type of measurement can be noisy as is common in the client device-reported performance numbers. The 'average' value in this table can be replaced by more practical set of values including many percentile points for fully informed decision making.

The observation period can be arbitrary. However experiences show that many servers show some daily patterns in traffic suggesting that either 12 or 24 hours of period will serve the statistical purposes well.

Applicability to Internet of Things (IoT) Use Cases

The teachings h can be applied, without limitation, to IoT use cases.

Figure 7A:
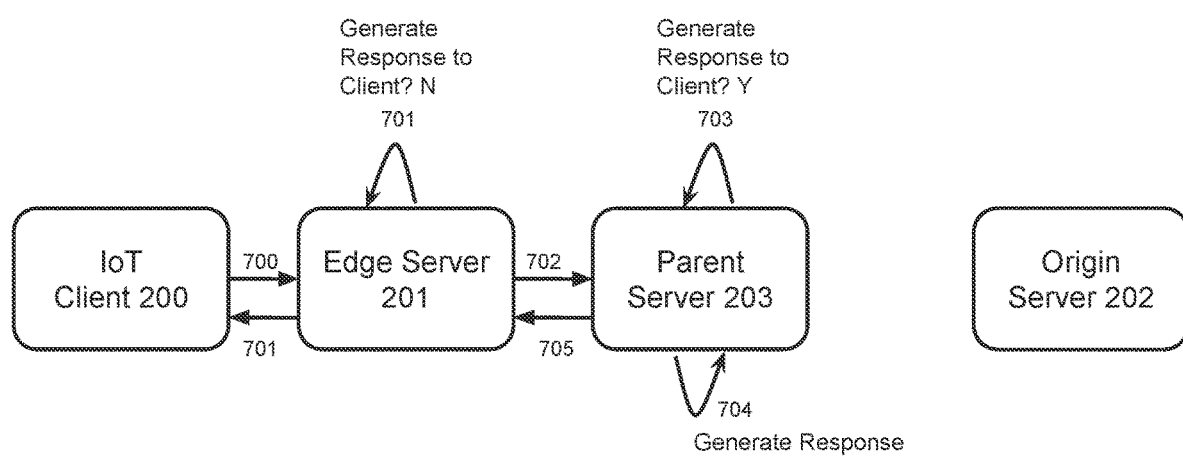
FIGS. 7A-C are diagrams illustrating Internet of Things (IoT) use cases for the teachings hereof; and, FIG. 8 is a diagram illustrating computer hardware that may be used to implement the teachings hereof.

With reference to FIG. 7A, for example, assume that the client 200 is running on a device such as a sensor, actuator, appliance, vehicle or embedded device that is connected to the Internet, and that in operation client 200 generates data about some real-world condition or event, and reports that data to the edge server 201.

From a global perspective, there may be many such clients 200 reporting data to many edge servers 201 deployed around the Internet, and the reported data is aggregated, formatted, or otherwise processed and sent upstream for further use.

Assume further that in certain situations, a given client 200 reports data upstream and expects a response from the system. The response may be, e.g.. an acknowledgement of the receipt of the data. The response may be a new configuration setting for the client 200, based on the data it has sent about its current configuration or some condition it has detected. The response may be a firmware update for the client 200 based on the latest firmware version that it has just reported. The response may, in general, be any response that results from processing the data reported from the client 200. The teachings hereof can be used to determine the best place for the response to be generated. Response generation may involve one or more computing tasks, such as: aggregating or examining or processing data sent by the client 200, fetching data such as a new configuration setting or firmware update from upstream, and generating a response in a format/package appropriate for the client 200, generating a query to the client 200 to elicit more data.

In sum, the client 200 reports data about itself or about something it is monitoring. Initially this is received at the edge 201. Ultimately, a response to the data report from the client 200 is generated at the edge 201 or one of the other nodes in the system, using the teachings described previously. Nodes run probability functions to determine whether to take on the task of responding, or to pass the task upstream. The node that performs the computing tasks (such as processing the client's reported data, fetching new configuration/updates, and/or otherwise generating a response) attaches a computing task locator(s) to the response, which travels downstream back the client 200. The client 200 sends a beacon out with the response latency that it experienced, along with the computing task locator, to the intelligence component 600.

FIG. 7A illustrates the case where the parent server 203 generates the response. At 700, the client issues its data report and/or request. At 701, the edge server 201 determines whether to generate the response (assume 'no' in this example); at 702 the edge server 701 issues the forward request: at 703 the parent server 203 decides it will generate the response; at 704 it performs the required computing tasks by internal routine and/or fetching data as needed; at 705 the response content is returned to the edge 200 for transmission, at 701 to the client 200.

Note that in some embodiments, the client 200 may be resource poor. To the extent that it does not make sense to burden the client 200 with generating the beacon. In such cases, the edge 201 can make an approximate performance measurement by marking the time at which it received the client request and the time at which it is able to send the response; the edge 201 then beacons this information to the intelligence component 600 on behalf of the resource poor client 200.

The teachings hereof may have particular benefit in the case of a mobile IoT client 200. This is because the system can dynamically adjust the place where the computing tasks are performed. With sufficiently frequent performance testing and adjustment cycles, the system can continuously adapt the place where the computing task is performed to the new location of the client 200, as it moves.

Figure 7B:
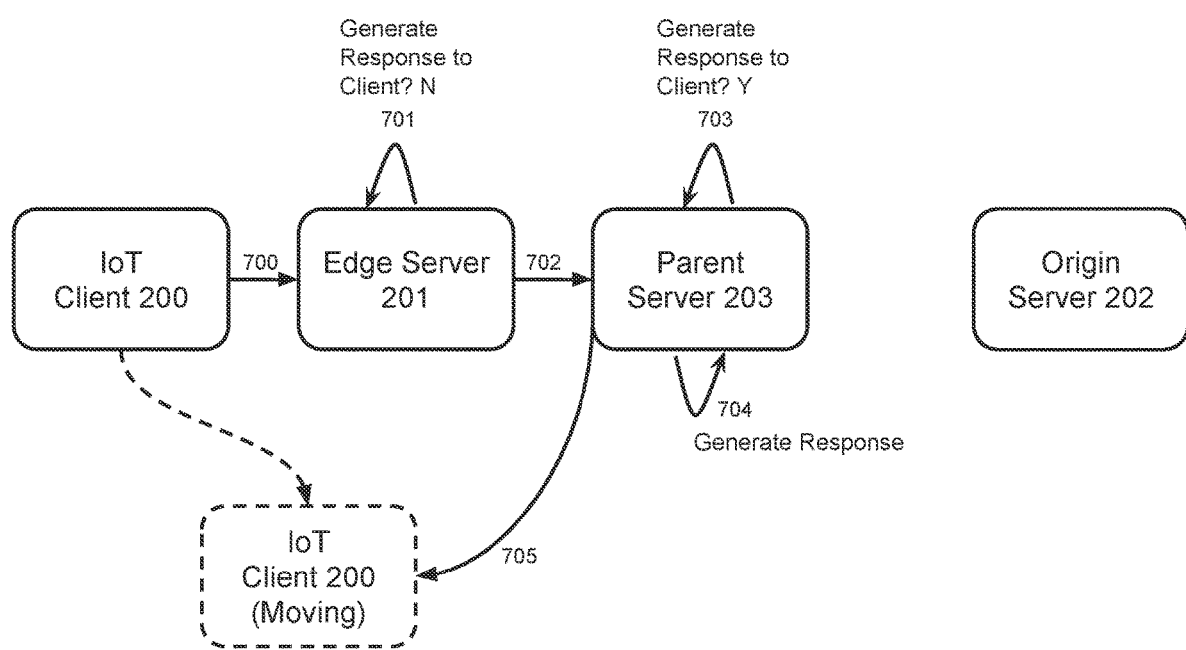

FIG. 7B illustrates how the mobile case can work, in one embodiment. In this situation, which is similar to that described with FIG. 7A, the parent server 203 decides to generate the response to the client 200. However, the response is sent directly back to the client 200 in a direct server return operation. If the client 200, being mobile, has moved closer to the parent 203 than the edge server 201, then it means that the parent server 203 may be able to provide a response with lower latency to the client 200 than the edge 201, and if so, the system will adjust such that the responses are generated at the parent 203 in preference to the edge 200.

Figure 7C:
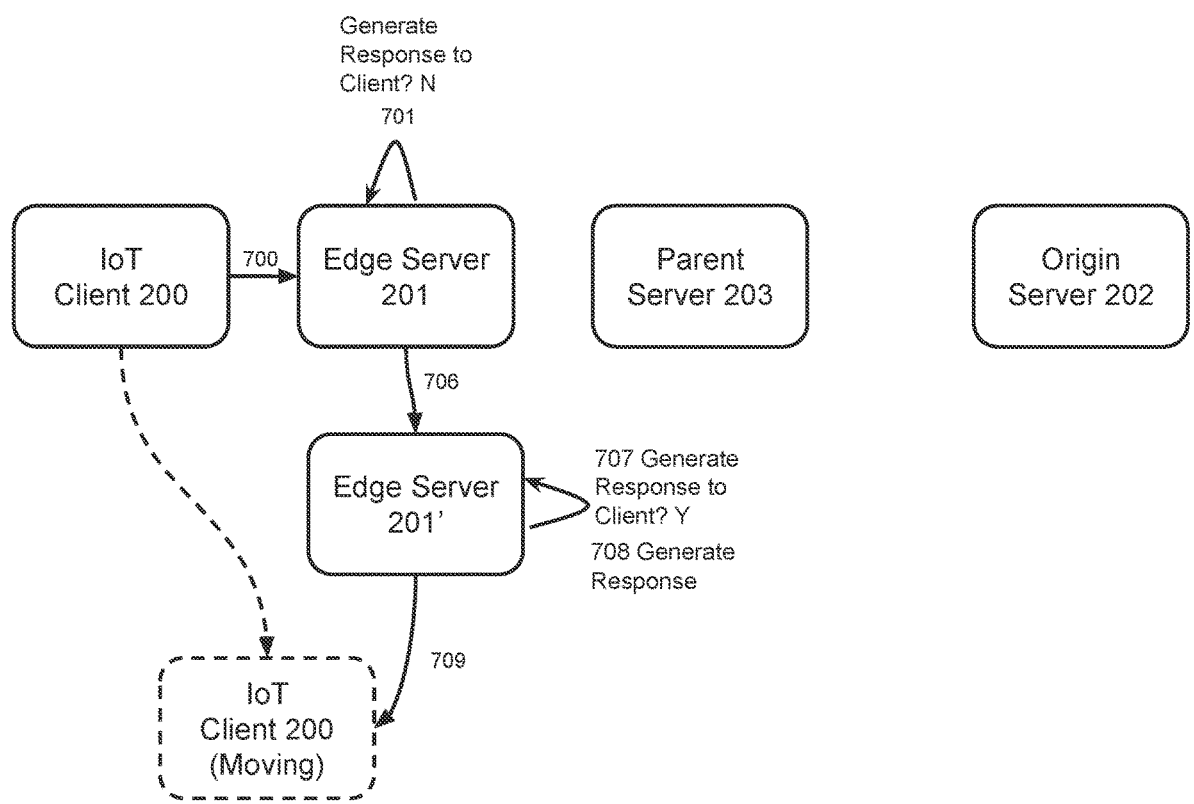

In some network architectures, parent servers are generally deployed deeper in a network, meaning they are unlikely to be closer to the client 200, even as the client 200 moves. The notion of an edge server 201' that is a sibling to the edge server 201, however, addresses this issue. In FIG. 7C, the sibling server 201' has received the forward request 706 and has determined to perform the computing task of generating the response at 707, 708. At 709 the sibling server 201' provides direct server return of the response; this may be faster (given the illustrated movement of the client 200) than observed in samples in which the edge server 201 generates and provides the response. The system will detect and adjust for this.

Use in Content Delivery Networks (CDNs)

In many embodiments, there are a large number edge servers deployed (e.g., as part of a CDN) on a global scale so that a particular edge server 201 services a small portion of the client traffic. That small portion of the clients are also assumed to be located close to the particular edge server 201 in terms of network distance such that the latency between the client and edge is also small.

This is in effect a grouping of client traffic by performance. A properly grouped client traffic therefore is likely to experience similar performance statistics with computing tasks. This similarity is the grounds for the sampling of client device for performance measurement and reporting; because the client group is likely to experience similar performance, a small sampling will adequately represent the commonly experienced performance by the client group. Preferably, the CDN edge 201 and parent 203 are dynamically and optimally selected for the client traffic characterization. In some embodiments, for example, the edge 201 and parent 203 which will service the client 200 are already chosen at the time of the the client's request according to well known CDN practices and request routing.

For some CDN providers, where the client grouping is not granular enough, the sampling size many need to grow to a large portion of the given client group. In this case, the performance sampling of the same client group is preferably larger and the statistical analysis cycle longer in accordance with the sampling size as the end user performance experience from the same client group may show a large degree of difference.

More information about CDN operation in general is known to those skilled in the art and also provided as follows. As noted, the teachings hereof may be implemented in a system in which the servers 201, 203, 204 are deployed by a CDN. More information about conventional CDN infrastructure can be found in U.S. Pat. Nos. 6,108,703; 7,293,093; 6,820,133; 7,274,658; 7,660,296; 7240100; 7,472,178; 7,376,716; 7,200,681; 7,752,258; 7,274,658, and 9,36,258. The contents of each and every of the foregoing patents are hereby incorporated by reference in their entireties, Among other things, those patents describe mechanisms by which a client 200 is directed (or redirected) to a particular edge server in the system, and by which the CDN can select upstream nodes (e.g., parents, siblings, origin) that the edge may contact. Without limitation, U.S. Pat. No. 7,376,716 describes a cache hierarchy arrangement of nodes that may be used herewith. Without limitation, U.S. Pat. No. 7,240,100 describes a customizable per-request server configuration system that may be used herewith. Without limitation, U.S. Pat. Nos. 7,660,296 and 6,820,133 describe overlay networking concepts and selection of upstream nodes that may be used herewith. Without limitation, U.S. Pat. No. 7,472,178 describes a network storage system that may be used as the origin server. Without limitation, U.S. Pat. No. 7,274,658 describes techniques for the selection of a parent server that may be used with the teachings hereof.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 8:
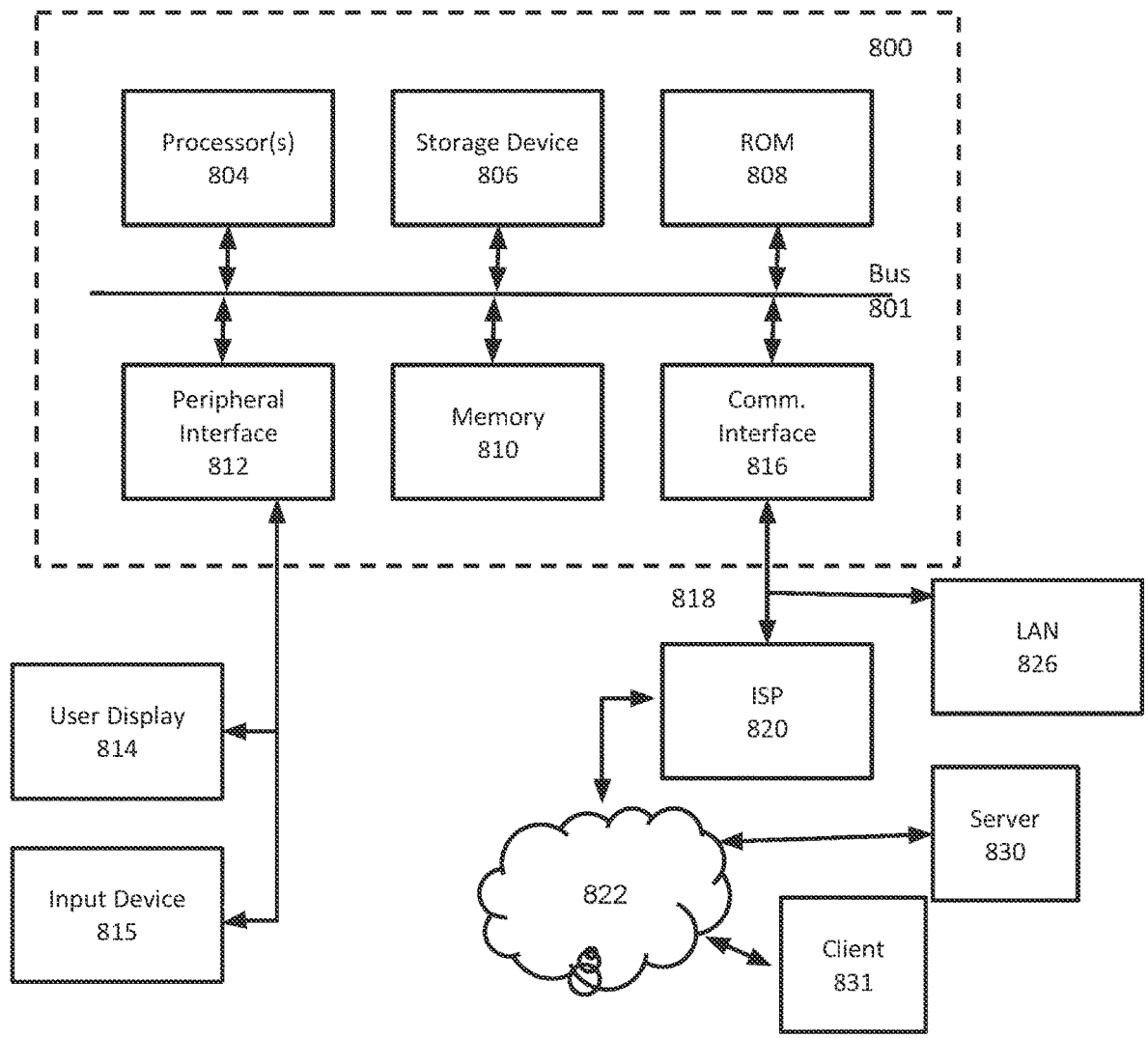

FIG. 8 is a block diagram that illustrates hardware in a computer system 800 upon which such software may run in order to implement embodiments of the invention. The computer system 800 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 800 includes a microprocessor 804 coupled to bus 801. In some systems, multiple processor and/or processor cores may be employed. Computer system 800 further includes a main memory 810, such as a random access memory (RAM) or other storage device, coupled to the bus 801 for storing information and instructions to be executed by processor 804. A read only memory (ROM) 808 is coupled to the bus 801 for storing information and instructions for processor 804. A non-volatile storage device 806, such as a magnetic disk, solid state memory (e.g., flash memory), or optical disk, is provided and coupled to bus 801 for storing information and instructions. Other application-specific integrated circuits (ASICs), field programmable gate arrays (FPGAs) or circuitry may be included in the computer system 800 to perform functions described herein.

A peripheral interface 812 communicatively couples computer system 800 to a user display 814 that displays the output of software executing on the computer system, and an input device 815 (e,g., a. keyboard, mouse, trackpad, touchscreen) that communicates user input and instructions to the computer system 800. The peripheral interface 812 may include interface circuitry, control and/or level-shifting logic for local buses such as RS-485, Universal Serial Bus (USB), IEEE 1394, or other communication links.

Computer system 800 is coupled to a communication interface 816 that provides a link (e.g., at a physical layer, data link layer,) between the system bus 801 and an external communication link. The communication interface 816 provides a network link 818. The communication interface 816 may represent a Ethernet or other network interface card (NIC), a wireless interface, modem, an optical interface, or other kind of input/output interface, Network link 818 provides data communication through one or more networks to other devices. Such devices include other computer systems that are part of a local area network (LAN) 826. Furthermore, the network link 818 provides a link, via an internet service provider (ISP) 820, to the Internet 822. In turn, the Internet 822 may provide a link to other computing systems such as a remote server 830 and/or a remote client 831. Network link 818 and such networks may transmit data using packet-switched, circuit-switched, or other data-transmission approaches.

In operation, the computer system 800 may implement the functionality described herein as a result of the processor executing code. Such code may be read from or stored on a non-transitory computer-readable medium, such as memory 810, ROM 808, or storage device 806. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 818 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for placing a computing task within a distributed computing system that comprises at least first and second servers, the method comprising, with the distributed computing system:

A. receiving a request originating from a client;

B. in response to receiving the request, performing one or more computing tasks to generate particular content to provide in response to the request, where the one or more computing tasks is performed by any of a first server or a second server;

C. where the one or more computing tasks is performed by the first server:
the first server providing, to a client-facing server, both the particular content and a computing task locator that identifies any of the first server and a group of servers of which the first server is a member, as having performed the one or more computing tasks;

D. where the one or more computing tasks is performed by the second server:
the second server providing, to a client-facing server, both the particular content and a computing task locator that identifies any of the second server and a group of servers of which the second server is a member, as having performed the one or more computing tasks;

E. sending a response to the request from the client-facing server, which is any of the first server, the second server, or another server in the distributed computing system; and, F. the client-facing server generating a beacon that includes performance data related to delivery of the particular content to the client and includes the computing task locator and sending the beacon to a component in the distributed computing system that adjusts a probability that the first server or the second server performs the one or more computing tasks.

2. The method of claim 1, further comprising including in the beacon the time at which the request originating from the client was received from the client, and the time at which the client-facing server sends a response.

3. The method of claim 1, wherein the second server receives a request from the first server to perform the one or more computing tasks, upon the first server determining not to perform the one or more computing tasks.

4. A distributed computing system deployed in one or more networks between a client and an origin node, the distributed computing system comprising:

circuitry forming a plurality of processors and memory storing computer program instructions executable on the plurality of processors to operate as specified below;
 A. receive a request originating from a client;
 B. in response to receiving the request, performing one or more computing tasks to generate particular content to provide in response to the request, where the one or more computing tasks is performed by any of a first server or a second server in the distributed computing system;
 C. where the one or more computing tasks is performed by the first server:
  the first server providing, to a client-facing server, both the particular content and a computing task locator that identifies any of the first server and a group of servers of which the first server is a member, as having performed the one or more computing tasks;
 D. where the one or more computing tasks is performed by the second server:
  the second server providing, to a client-facing server, both the particular content and a computing task locator that identifies any of the second server and a group of servers of which the second server is a member, as having performed the one or more computing tasks;
 E. send a response to the request from the client-facing server, which is any of the first server, the second server, or another server in the distributed computing system; and,
 F. the client-facing server generating a beacon that includes performance data related to delivery of the particular content to the client and includes the computing task locator and sending the beacon to a component in the distributed computing system that adjusts a probability that the first server or the second server performs the one or more computing tasks.

5. The distributed computing system of claim 4, the beacon including the time at which the request originating from the client was received from the client, and the time at which the client-facing server sends a response.

6. The distributed computing system of claim 4, wherein the second server receives a request from the first server to perform the one or more computing tasks, upon the first server determining not to perform the one or more computing tasks.

7. A non-transitory computer-readable medium storing computer-program instructions for execution on one or more processors, the computer-program instructions including instructions for:

A. receiving a request originating from a client;
 B. in response to receiving the request, performing one or more computing tasks to generate particular content to provide in response to the request, where the one or more computing tasks is performed by any of a first server or a second server in a distributed computing system;
 C. where the one or more computing tasks is performed by the first server:
  the first server providing, to a client-facing server, both the particular content and a computing task locator that identifies any of the first server and a group of servers of which the first server is a member, as having performed the one or more computing tasks;
 D. where the one or more computing tasks is performed by the second server:
  the second server providing, to a client-facing server, both the particular content and a computing task locator that identifies any of the second server and a group of servers of which the second server is a member, as having performed the one or more computing tasks;
 E. sending a response to the request from the client-facing server, which is any of the first server, the second server, or another server in the distributed computing system; and,
 F. the client-facing server generating a beacon that includes performance data related to delivery of the particular content to the client and includes the computing task locator and sending the beacon to a component in the distributed computing system that adjusts a probability that the first server or the second server performs the one or more computing tasks.

8. The non-transitory computer-readable medium of claim 7, further comprising including in the beacon the time at which the request originating from the client was received from the client, and the time at which the client-facing server sends a response.

9. The non-transitory computer-readable medium of claim 7, wherein the second server receives a request from the first server to perform the one or more computing tasks, upon the first server determining not to perform the one or more computing tasks.

* * * * *